United States Patent Office 3,440,300
Patented Apr. 22, 1969

3,440,300
DYNAMIC STABILIZATION OF A PLATINUM-ALUMINA CATALYST IN AN ISOMERIZATION REACTION
John H. Estes, Wappingers Falls, and John M. Crone, Jr., Fishkill, N.Y., assignors to Texaco Inc., New York, N.Y., a corporation of Delaware
No Drawing. Filed Sept. 27, 1966, Ser. No. 582,221
Int. Cl. C07c 5/30
U.S. Cl. 260—683.68                9 Claims

ABSTRACT OF THE DISCLOSURE

A platinum-alumina catalyst activated with a halogenated hydrocarbon is stabilized by (a) heating the platinum-alumina at a temperature of 600–1200° F. with a non-reactive gas, such as nitrogen, air, oxygen, or helium flowing through the catalyst, (b) adjusting the temperature to 150–700° F. in the presence of a non-reactive gas and (c) contacting the catalyst at a temperature of 150–700° F. with either an organic chloride of at least 2 carbon atoms in an oxygen atmosphere or with a compound from the group: carbon tetrachloride, chloroform, methylene chloride, phosgene or trichloroacetyl chloride to provide a stabilized catalyst having a chlorine content of 3–10 wt. percent. The catalyst may be stabilized in situ during an isomerization reaction.

---

This invention relates to a hydrocarbon conversion process and, more particularly, to a process for preparing a catalyst useful for hydrocarbon conversion particularly the isomerization of isomerizable hydrocarbons. This invention also relates to the catalysts itself. In accordance with this invention, a commercially useful process for isomerizing hydrocarbons particularly those within the $C_4$–$C_6$ range inclusive is provided together with the catalyst characterized by high activity together with long catalytic life. The term "stabilization" as used herein refers to the process of imparting to a catalyst extended catalytic life.

U.S. Patent 3,242,228 of Mar. 22, 1966 entitled "Hydrocarbon Isomerization Process and Catalyst" to Riordan et al. is directed to the preparation of a novel isomerization catalyst useful in isomerizing normal paraffins in the $C_4$–$C_6$ range which is prepared by compositing platinum and alumina wherein the major portion is alumina and platinum is present in amounts between about 0.01 and 1% by weight. The composite is contacted with a chloride activating agent, e.g. carbon tetrachloride, chloroform, methylene chloride, phosgene, and trichloroacetyl chloride at a temperature within the range of 300–600° F. to thereby form a chlorided composite wherein the chloride is present in the rang of about 3–10% by weight. This composite can thereafter be heated to a temperature within the range of say 400–1000° F. whereby part of the chloride is removed therefrom forming a catalyst containing chlorine in the range from about 2.5 to 7 weight percent. The resulting chloride activated and heat treated catalyst is highly active for the isomerization of the aforementioned paraffin hydrocarbons at specified conditions.

Such a catalyst can be used to isomerize these paraffin hydrocarbons at temperatures in the range of 200–400° F. while the hydrocarbons pass through a vessel containing the catalyst at a liquid hourly space velocity (LHSV) within the range from about 0.5–10.0 with a hydrogen to hydrocarbon mol ratio of between 0.05:1 and 5.0:1 preferably within the range of about 2:1 to 5:1 for pentanes and hexanes and about 0.1:1 to 1:1 for butanes.

The heat treatment so provided in accordance with that patent removes some of the chloride under either static conditions or under conditions wherein a stream of gas is passed through the catalyst to assist in displacing the evolved gas and provide uniform flow of heat to the system. The patent discloses stabilization using a flow of hydrogen chloride therethrough of about .010–.015 volume per minute per volume of catalyst.

In commercial operations, it is desired to utilize a hydrocarbon conversion catalyst, e.g. an isomerization catalyst which does not require removal from the hydrocarbon conversion vessel for reactivation, regeneration or stabilization. Such a catalyst must be one which can be not only activated in situ but also stabilized in situ. Hence, the process for stabilizing such a catalyst will require substantial flow rates of stabilizing gases, etc. through the hydrocarbon reactor at substantial temperatures. It has been found, that use of high flow rates of gas, e.g. air through a bed of halohydrocarbon atcivated platinum-alumina catalyst causes removal of a small but essential portion of the halide content, e.g. chlorine from the catalyst. The amount removed is relatively insensitive to volumes of gas passed over the catalyst. It is believed the chlorine is derived from a platinum-chlorine-aluminum complex responsible for the observed activity; the active form of the catalyst. The alternative for static stabilization according to the aforementioned patent is not readily suited to scale-up as it requires a substantial period of time for passage of gas through the hydrocarbon conversion reactor containing the catalyst at the low flow rate of .010–.015 volume per minute per volume of catalyst. Hence, it is highly desirable to provide a process for the stabilization of a halohydrocarbon activated platinum-alumina composite which process can be performed dynamically while the catalyst is in the hydrocarbon reactor itself, i.e. in situ and wherein the resultant catalyst has substantially the same activity as the unstabilized catalyst.

It is an object of this invention, therefore, to provide a stabilized halohydrocarbon atcivated platinum-alumina composite catalyst useful as a catalyst in hydrocarbon conversion, particularly isomerization of isomerizable hydrocarbons.

It is another object of this invention, therefore, to provide a dynamic process for the in situ stabilization of a halohydrocarbon activated platinum-alumina composite catalyst.

It is another object of this invention, therefore, to provide a dynamic process for the in situ stabilization of a halohydrocarbon acivated platinum-alumina composite catalyst which can be performed without the necessity of employing expensive chemicals, relatively long reaction periods or expensive reaction vessels.

These and other objects of this invention will become apparent from the following more complete description of our invention and appended claims.

The invention is an improvement in the method of stabilizing a platinum-alumina composite catalyst activated using a halohydrocarbon, e.g. a chlorinated hydrocarbon as more fully disclosed below. The catalyst is useful in hydrocarbon conversion particularly hydrocracking, alkylation of alkylatable hydrocarbons and isomerization of isomerizable hydrocarbons particularly the normal paraffins in the $C_4$–$C_6$ range inclusive as well as naphthenic compounds such as methyl cyclopentane, cyclohexane, dimethyl cyclopentane. In accordance with the invention, a halogenated hydrocarbon activated platinum-alumina composite is stabilized dynamically by the steps of: (a) heating the composite to a temperature between 600 and 1200° F., suitably 800° F. in the presence of a non-reactive gas, suitably air, oxygen nitrogen, or helium, suitably under a pressure of between about 0 p.s.i.a. and 1000 p.s.i.g., most suitably 400 p.s.i.g., said non-reactive gas flowing through said composite at a volumetric flow rate of at least 300, preferably between 300 and 50,000, standard cubic feet per hour per square foot of reactor cross section for at least 0.1 hour, generally up to 20 hours, suitably 2 hours; (b) adjusting the temperature of the so heated composite in the presence of a non-reactive gas at a pressure of between about 0 p.s.i.a. and 1,000 p.s.i.g. to between 150 and 700° F., suitably 350° F.; and (c) contacting the composite with a compound selected from the group consisting of carbon tetrachloride, chloroform, methylene chloride, phosgene and trichloroacetyl chloride or in an oxygen atmosphere with an organic chloride having at least 2 carbon atoms and a mol ratio of hydrogen to chlorine less than 1.0, at a dosage sufficient to adjust the chlorine content of the resultant stabilized catalyst to between 3.0 and 10.0 percent by weight, preferably over a period of at least 0.5 hour, and most preferably between 0.5 and 24 hours, at a temperature between 150 and 700° F. and a pressure between about 0 p.s.i.a. and 1,000 p.s.i.g., preferably in the presence of a non-reactive gas, most suitably air, flowing through the composite at a volumetric flow rate of between 500 and 50,000 standard cubic feet per hour per square foot of reactor cross-section.

In a particularly desirable embodiment, the dynamic stabilization process of this invention is performed by (a) heating the activated platinum-alumina composite to between 800 and 1,000° F. while nitrogen at a pressure of between 0 p.s.i.a. and 400 p.s.i.g. is passed through said composite at a rate of between 900 and 20,000 standard cubic feet per hour per square foot of reactor cross-section over a period of between 2 and 6 hours; (b) adjusting the temperature of the so heated composite to between 300 and 400° F. while passing nitrogen through said composite under pressure of between about 0 p.s.i.a. and 400 p.s.i.g.; (c) continuing nitrogen addition at a rate of between 900 and 15,000 standard cubic feet per hour per square foot of reactor cross section at a temperature of between 300° F. and 450° F. and a pressure of between about 0 p.s.i.a. and 100 p.s.i.g.; and (d) contacting the composite with $CCl_4$ admitted at a dosage between about 0.1–0.3 that required for the initial activation of the activated platinum-alumina composite, over a period of between 1 and 10 hours. The process of this invention is suitably performed by an in situ method, i.e. within the isomerization or other hydrocarbon conversion reactor itself. The process can also be dynamically performed by withdrawing the catalyst to be stabilized from the hydrocarbon conversion vessel and charging the same into a separate vessel for dynamic catalyst stabilization. In such a case, a fixed bed, or fluidized bed system as more fully described below can be employed.

It should be noted that a non-reactive gas is utilized in the process of this invention during the two principal steps of the stabilization, i.e. the heating step and the step involving treatment with halohydrocarbon. By the term "non-reactive gas" we mean a gas which does not substantially react with the composite or with any agents subsequently introduced to the system to the extent as to preclude stabilization of a catalyst. In this application, the term "standard cubic feet per hour (s.c.f.h.) per square foot of reactor cross-section" means the volumetric flow rate at standard conditions (60° F. 1 atmosphere) per area of reactor cross-section.

Activated catalysts which can be stabilized according to the dynamic stabilization process of the instant invention include those catalysts prepared by contacting a platinum-alumina composite with an organic halide, e.g. an organic chloride containing at least 2 carbon atoms and a mol ratio of hydrogen to chlorine less than 1.0 in an atmosphere containing gaseous oxygen under activating conditions preferably at a temperature of 300–800° F. Included within this definition of organic chlorides are sym-tetrachloroethane, tetrachloroethylene, hexachloroethane, pentachloroethane, hexachlorobutadiene, hexachloropropanone-2, hexachloropropene $$(CCl_3—CCl=CCl_2)$$

and octachloropropane ($CCl_2—CCl_2=CCl_3$) and trichloroacetyl chloride. The activated platinum-alumina composite contains about 0.01 to about 2.0 weight percent platinum and about 3.0–12 weight percent chlorine, the balance alumina. Still other catalysts which can be stabilized by our dynamic stabilization procedure are those catalysts prepared by forming a composite comprising a major portion of alumina and 0.01 to about 1 percent by weight platinum and contacting the composite with an activating agent such as carbon tetrachloride, chloroform, methylene chloride, phosgene, trichloroacetyl chloride and heating the composite with the activating agent under conditions of temperature and pressure sufficient to cause activation of the catalysts, preferably in the range of about 300 to 650° F. It should be realized, however, that the foregoing catalysts are only illustrative of those catalysts which can be stabilized according to the process of the instant invention.

In a still more desirable embodiment of this invention, a catalyst useful for the isomerization of isomerizable hydrocarbons particularly normal paraffins in the $C_4$–$C_6$ range is treated by heating a platinum-alumina composite containing about 0.01–2.0 weight percent platinum at a temperature between 700 and 1300° F., most suitably 1000° F. in the presence of air over a period of between 8 and 12 hours under a pressure between 0.25 and 70 atmospheres, conveniently 1 atmosphere, to dehydrate the composite and prepare the same for subsequent activation. In this case it is preferred that the air utilized have a dew point between +10° F. and −100° F., most suitably −30° F. and that the air flow through the catalyst be reversed for the last 2 hours of this dehydration procedure. The dehydrated platinum-alumina composite is then activated using a multi-chlorinated hydrocarbon, e.g. carbon tetrachloride by injecting the same into a vessel containing the dehydrated platinum-alumina composite together with a dry gas, such as air, nitrogen or helium in amounts sufficient to prepare a chlorinated hydrocarbon activated platinum-alumina catalyst containing chlorine in the amount of 3–12 percent by weight, based on the weight of the activated catalyst. The activation of the platinum-alumina catalyst is preferably formed using a dry gas-multi-chlorinated hydrocarbon reverse flow after 80% of the multi-chlorinated hydrocarbon has been admitted to the vessel containing the platinum-alumina composite. This reverse gas treatment has been found to provide greater uniformity of the activation of the platinum-alumina composite within the bed particularly at the center of the bed and the portion of bed proximate the exit. The activated catalyst is then stabilized dynamically by the method disclosed above preferably using carbon tetrachloride. Carbon tetrachloride is preferred for obvious economical reasons.

We have found the dynamic stabilization process of this invention can be utilized in commercial size operations with great ease and with limited operational expense and without the necessity of costly equipment. In fact, the process of this invention provides an in situ dynamic stabilization process which can stabilize the activated platinum-alumina composite within the hydrocarbon conversion reactor itself. Hence, we provide a process which can be performed without the necessity of withdrawing the catalyst from the isomerization or other hydrocarbon conversion reactor. We have found that our process provides a highly active catalyst characterized by extremely long catalytic life particularly with respect to n-butane isomerization; and pentane and hexane isomerization at high activity levels.

As stated above, one can employ an organic chloride having at least 2 carbon atoms and a mol ratio of hydrogen to chlorine less than 1.0 in an atmosphere containing gaseous oxygen, e.g. sym-tetrachloroethane.

The process of our invention can be performed using a static heating zone wherein the non-reactive gas, e.g. oxygen, nitrogen, helium and/or air used in the heating step is introduced as a stream passing over or through the activated catalyst in the fixed bed. In this case, means can be employed to expose the entire surface of the catalyst to the flow of non-reactive gas passing therethrough. A fixed bed agitating means can be utilized. In still another embodiment, a rotating tumbler equipped with baffles or flights can be used, the tumbler being equipped with gas inlet and exit means through which the gases enter and exit at the various temperatures. The composite temperatures can be adjusted to between 150° F. or 700° F., preferably about 350° F. with continued addition of gas at the rate above specified. In commercial operations this can be done by the same general method as the heat treatment portion of the dynamic stabilization step. The same pressure as the pressure used during the heating portion of the stabilization process can be maintained on the dynamically heat treated platinum-alumina composite while the temperature is adjusted to between 150 and 700° F.

The treatment of the platinum-alumina composite whose temperature has been adjusted between 150 and 700° F. with one of the aforementioned halohydrocarbons is essential for preparation of a highly active catalyst characterized by long catalytic life in accordance with our process. If the amount of halohydrocarbon be it one of those specifically mentioned above or be it one of the organic chlorides having at least 2 carbon atoms in a mol ratio of hydrogen to chloride less than 1, must be sufficient to provide at least 3.0 percent by weight chlorine, in the resultant stabilized platinum-alumina composite catalyst. If the dosage of the halohydrocarbon is below the minimum needed to provide this minimum chlorine content in the platinum-alumina composite, then the catalyst so prepared does not have the desired catalytic activity and/or catalytic life. On the other hand, one can suitably add on upwards of 10 percent or more by weight chlorine to the stabilized platinum-alumina composite without deleterious effect. Generally, however, suitable stabilized catalysts have between 3.0 and 10.0 percent by weight chlorine thereon. At chlorine content above 10.0 percent by weight the pellet strength of the catalyst tends to decrease without any appreciable increase in catalytic properties. Since the halohydrocarbons which can be utilized in the second principal step of our stabilization process differ widely it is impossible to set forth the dosage in terms of the compounds themselves and hence this dosage is set forth in terms of the desired product. It will be evident that compounds containing a high chlorine content may require less mols than those set forth above which have lower chlorine content. It will also be apparent that the class of organic chlorides which are added in an atmosphere containing gaseous oxygen will differ with respect to the dosage depending upon how readily the organic chloride donates its chlorine to the composite. Concomitant with the required dosage it is important that the activated composite be treated with halohydrocarbon for at least 0.5 hour. This is desired because treatment for less period of times does not provide the required chemical-physical interaction of the halohydrocarbon with the composite sufficient to provide a highly activated catalyst having extended catalytic life and the required chlorine content. On the other hand, it is not at all harmful to treat the catalyst for longer than say 24 hours and, in fact, some advantage can occur. Generally, however, appreciable lengthening of the catalyst life and/or increase in the activity is not obtained. Our process is advantageously carried out using at least a flow rate of nonreactive gas carrying the halohydrocarbon through the heated platinum-alumina composite, of at least 510 standard cubic feet per hour per square foot of reactor cross-section.

In order to more fully illustrate the nature of the instant invention and the manner of practicing the same the following example is presented showing the best mode contemplated by us for carrying out our invention.

Example 1

Into a 12 foot by 1.5 inch diameter nickel tube is charged a platinum-alumina composite prepared by pilling beta-alumina trihydrate, calcining at 930° F. for 2 hours, recycling to room temperature, impregnating with an aqueous solution of chloroplatinic acid and ethylene diamine, drying and calcining at 1050° F. for 2 hours. The platinized alumina composite resulting therefrom was predominantly eta-alumina containing a 0.6 percent by weight platinum. The composite is then heated in bed form at about 1000° F. and atmospheric pressure with −30° F. dew point air flow therethrough at a rate of 270 pounds per hour per square foot of reactor cross section. The heated composite is held at that temperature during air flow over a period of about 10 hours after the outlet air dew point reaches −20° F. For 4 of the 10 hours the direction of the air flow is reversed. There is then introduced into the nickel tube −30° F. dew point air at 475° F. at 50 p.s.i.g. flowing at a rate of 270 pounds per hour per square foot of reactor cross-section. Carbontetrachloride at a dosage of 11 volumes $CCl_4$ for 100 volumes of platinum-alumina composite is introduced and after 80 percent of the $CCl_4$ is added the flow of the carbon tetrachloride is reversed. The catalyst is then heated to 1000° F. for 2 hours while oxygen is passed through the bed at a rate of 0.5 cubic feet per hour. Oxygen addition is continued without the application of heat until the temperature of the bed decreases to about 500° F. Oxygen addition continues at the rate of 0.5 cubic foot per hour through the bed for a period of 1 hour while there is admitted together with the oxygen over this period 4.5 grams of carbon tetrachloride. There is thus prepared a catalyst containing platinum and alumina together with 6.6 weight percent chlorine thereon.

This catalyst was evaluated for hexane isomerization at standard conditions of 300° F., 300 p.s.i.g., 1 LHSV and 2:1 hydrogen/hydrocarbon mol ratio. The catalyst provided 92.4% conversion of the hexane to a isohexane, 33.4 percent of which was 2,2-dimethyl butane. The high conversion to 2,2-dimethyl butane is an indication of high catalytic activity and is used as a standard to measure the ability of a catalyst to isomerize a hexane or light straight run naphtha feed.

Example 2

A platinum-alumina composite activated in accordance with Example 1 was stabilized by heating for 2 hours at a temperature of 800° F. while passing hydrogen gas through the composite at a rate of 6.3 pounds per hour per square foot of reactor cross-section. The temperature of the so heated composite was decreased to 500° F. while the composite was swept with nitrogen. Air was admitted through the composite at a rate of 90 pounds per hour per square foot of reactor cross section. With the catalyst composite at 500° F., between 3 and 4 cc. of carbon tetrachloride per 100 cc. of platinum-alumina composite was added.

The so stabilized composite showed between 61 and 62 weight percent initial conversion of n-butane to isobutane under isomerization conditions of 335° F., 500 p.s.i.g., 2.0 LHSV, and a hydrogen to butane mol ratio of 0.2. This catalyst also showed initial conversion of n-hexane to an isohexane of 89.4 percent, 32.1 percent of which was 2,2-dimethyl butane. The isomerization of the n-hexane was performed at 300° F., 300 p.s.i.g., 1 LHSV, and a mol ratio of hydrogen to normal hexane of 3.2.

Example 3

A catalyst activated in accordance with Example 1 was stabilized in a three foot high bed by passing hydrogen gas therethrough at a rate of 6.3 pounds per hour per square foot catalyst for a period of 2 hours at 1 atmosphere. The temperature of the catalyst being heat treated was 800° F. After the catalyst had been heat treated for 2 hours it was allowed to cool to a temperature of 500° F. while nitrogen was swept through the composite. When the catalyst temperature reached 500° F. air passed therethrough at a rate of 90 pounds per hour per square foot of reactor cross-section carrying a total of 3 cc. carbon tetrachloride per 100 cc. catalyst over a period of 0.75 hour.

The stabilized catalyst was tested for n-hexane isomerization under 300 p.s.i.g., 1 LHSV, and a mol ratio of hydrogen to normal hexane of 3.2. At 300° F. the catalyst showed a total conversion of n-hexane to a isohexane of 89 percent, 32.2 percent of which was 2,2-dimethyl butane. At 275° F. the total conversion was 90.8 percent, 34.1 percent of which was 2,2-dimethyl butane. The same catalyst was tested for n-butane isomerization at 335° F., 500 p.s.i., 2.0 LHSV and 0.2 hydrogen/n-butane mol ratio. It showed an initial conversion of n-butane to isobutane of 62 percent. The conversion dropped slightly to 58–59 percent after 150 hours.

It is seen that we have provided a significantly useful process for stabilizing halohydrocarbon activated platinum-alumina catalysts useful for hydrocarbon conversion processes, particularly isomerization of isomerizable hydrocarbons. It is also apparent that our process can be performed without the necessity of employing expensive chemicals, costly equipment or high temperatures or pressures. It is significant that our process can be performed in a short period of time without the necessity of withdrawing the catalyst from a hydrocarbon conversion reactor.

The terms and expressions which have been employed herein are used as terms of description and not of limitation as there is no intention, in the use of such terms and expressions, of excluding any equivalents of the features shown and described or portions thereof, but it is recognized that various modifications are possible within the scope of the invention claimed.

What is claimed is:
1. A process for stabilizing a halogenated hydrocarbon activated platinum-alumina composite which comprises:
  (a) heating the composite for at least 0.1 hour at a temperature of between 600 and 1200° F. in the presence of a non-reactive gas flowing through said composite at a volumetric flow rate of at least 300 standard cubic feet per hour per square foot of reactor cross-section;
  (b) adjusting the temperature of the so heated composite in the presence of a non-reactive gas to between 150° F. and 700° F.; and
  (c) contacting said composite at a temperature between 150 and 700° F. with (1) an organic chloride having at least two carbon atoms and a mole ratio of hydrogen to chlorine less than 1.0 in an oxygen atmosphere or with (2) a compound selected from the group consisting of carbon tetrachloride, chloroform, methylene chloride, phosgene and trichloroacetyl chloride at a dosage sufficient to adjust the chlorine content of the resultant stabilized catalyst to between 3.0 and 10.0 percent by weight.

2. A process according to claim 1 wherein said composite is heated in the presence of a non-reactive gas under a pressure of between about 0 p.s.i.a. and 1,000 p.s.i.g.; said non-reactive gas flows through said composite at a volumetric flow rate of between 300 and 50,000 standard cubic feet per hour per square foot of reactor cross-section for a period of time between 0.1 and 20 hours, said non-reactive gas is under a pressure of between about 0 p.s.i.a. and 1,000 p.s.i.g. while the temperature of the so heated composite is adjusted to between 150° F. and 700° F.; and wherein an organic chloride having at least two carbon atoms and a mole ratio of hydrogen to chlorine less than 1.0 is employed in an oxygen atmosphere in step (c).

3. A process according to claim 1 wherein said composite is heated in the presence of a non-reactive gas under a pressure of between about 0 p.s.i.a. and 1,000 p.s.i.g.; said non-reactive gas flows through said composite at a volumetric flow rate of between 300 and 50,000 standard cubic feet per hour per square foot of reactor cross-section for a period of time between 0.1 and 20 hours; said non-reactive gas is under pressure of between about 0 p.s.i.a. and 1,000 p.s.i.g. while the temperature of the so heated composite is adjusted to between 150° F. and 700° F.; and wherein carbon tetrachloride is employed in step (c).

4. A process according to claim 1 wherein said composite is heated to a temperature of 800° F. in the presence of hydrogen under pressure of 400 p.s.i.g. flowing through said composite at a rate of between 300 and 50,000 standard cubic feet per hour per square foot of reactor cross-section for 2 hours; the temperature of the composite is adjusted to between 300° F. and 450° F. in the presence of air under a pressure of between about 0 p.s.i.a. and 1,000 p.s.i.g.; and wherein the composite is contacted with carbon tetrachloride admitted at a dosage between about 0.1–0.3 that required for the initial activation of the halogenated hydrocarbon activated platinum-alumina composite, over a period of between 1 and 10 hours in the presence of air passing through said composite under a pressure of between 0 p.s.i.a. and 1,000 p.s.i.g. at a rate of between 300 and 50,000 standard cubic feet per hour per square foot of reactor cross-section.

5. A process for isomerizing an isomerizable hydrocarbon which comprises contacting said isomerizable hydrocarbon at isomerization conditions with a halogenated hydrocarbon activated platinum-alumina composite dynamically stabilized in situ by the steps of:
  (a) heating said composite in an isomerization reactor for at least 0.1 hour at a temperature between 600 and 1200° F. in the presence of a non-reactive gas flowing through said composite at a volumetric flow rate of at least 300 standard cubic feet per hour per square foot of said reactor cross-section;
  (b) adjusting the temperature of the so heated composite in the presence of a non-reactive gas to between 150° F. and 700° F.; and
  (c) contacting said composite at a temperature between 150 and 700° F. with (1) an organic chloride having at least two carbon atoms and a mole ratio of hydrogen to chlorine less than 1.0 in an oxygen atmosphere or with (2) a compound selected from the group consisted of carbon tetrachloride, chloroform, methylene chloride, phosgene and trichloroacetyl chloride at a dosage sufficient to adjust the chlorine content of the resultant stabilized catalyst to between 3.0 and 10.0 percent by weight.

6. A process according to claim 5 wherein said isomerization conditions include a reaction temperature within the range of about 200° F. to 400° F., a liquid hourly space velocity within the range of about 0.5 to 10 volumes hydrocarbon feed per volume of catalyst and a hydrogen to hydrocarbon feed mol ratio of between about 0.05:1 and 5.0:1.

7. A process according to claim 6 wherein the hydrocarbon being isomerized is n-butane and the hydrogen to hydrocarbon mol ratio is between 0.1:1 and 1:1.

8. A process according to claim 6 wherein the hydrocarbon being isomerized is n-hexane and the mole ratio of hydrogen to hydrocarbon is between 0.05:1 and 5.0:1.

9. A process according to claim 6 wherein the hydrocarbon being isomerized is n-hexane and the mol ratio of hydrogen to hydrocarbon is between 0.05:1 and 5.0:1.

References Cited

UNITED STATES PATENTS

| | | | |
|---|---|---|---|
| 2,880,168 | 3/1959 | Feller | 252—411 |
| 3,182,013 | 5/1965 | Myers | 260—683.68 |
| 3,242,228 | 3/1966 | Riordan et al. | 260—683.68 |

PAUL M. COUGHLAN, JR., *Primary Examiner.*

G. J. CRASANAKIS, *Assistant Examiner.*

U.S. Cl. X.R.

252—441, 442